US010888827B2

(12) United States Patent
Wendt et al.

(10) Patent No.: US 10,888,827 B2
(45) Date of Patent: Jan. 12, 2021

(54) COMPONENT MIXING JET

(71) Applicant: Hennecke GmbH, Sankt Augustin (DE)

(72) Inventors: Marc Wendt, Koenigswinter (DE); Jens Geuer, Hennef (DE); Lars Etschenberg, Siegburg (DE)

(73) Assignee: HENNECKE GMBH, Sankt Augustin (DE)

( * ) Notice: Subject to any disclaimer, the term of this patent is extended or adjusted under 35 U.S.C. 154(b) by 16 days.

(21) Appl. No.: 16/280,637

(22) Filed: Feb. 20, 2019

(65) Prior Publication Data

US 2019/0262786 A1 Aug. 29, 2019

(30) Foreign Application Priority Data

Feb. 23, 2018 (DE) .................. 10 2018 104 209

(51) Int. Cl.
*B01F 5/02* (2006.01)
*B05B 1/30* (2006.01)
*B05B 7/04* (2006.01)
*B05B 12/08* (2006.01)
*B29B 7/76* (2006.01)

(52) U.S. Cl.
CPC .......... *B01F 5/0281* (2013.01); *B05B 1/3006* (2013.01); *B05B 1/306* (2013.01); *B05B 1/3013* (2013.01); *B05B 7/0408* (2013.01); *B05B 12/088* (2013.01); *B29B 7/7657* (2013.01)

(58) Field of Classification Search
CPC ... B01F 5/0281; B05B 1/3006; B05B 1/3013; B05B 1/302; B05B 1/306; B05B 7/04; B05B 7/0408; B05B 12/088; B29B 7/7652; B29B 7/7657; B29B 7/801; F16K 31/126; F16K 31/1266; F16K 31/128; F16K 41/103
USPC ........................................................ 239/548
See application file for complete search history.

(56) References Cited

U.S. PATENT DOCUMENTS

| 2,186,214 A | 1/1940 | Simon |
| 3,084,901 A | 4/1963 | Thorburn |
| 3,463,363 A | 8/1969 | Zelna |

(Continued)

FOREIGN PATENT DOCUMENTS

| DE | 1926781 A1 | 11/1970 |
| DE | 2360154 A1 | 6/1974 |

(Continued)

*Primary Examiner* — Darren W Gorman
(74) *Attorney, Agent, or Firm* — Lucas & Mercanti, LLP; Klaus P. Stoffel

(57) ABSTRACT

A component mixing jet including a jet nozzle housing with at least one component inlet and one component outlet. An axially movable jet needle is arranged in a reception in the jet nozzle housing and can rest against the jet nozzle housing with an axial end in the region of the component outlet in a sealable manner. The jet needle is connected with a membrane fixed in the jet nozzle housing. A pressure chamber is arranged in the jet nozzle housing at the side of the membrane averted from the axial end of the jet needle. The membrane is a holding element for the jet needle and guides the jet needle axially and holds it radially in the reception. The axial region between the membrane and the axial end of the jet needle is free from any bearing element for the jet needle in the region of the component outlet.

7 Claims, 4 Drawing Sheets

(56) References Cited

U.S. PATENT DOCUMENTS

| | | | |
|---|---|---|---|
| 5,549,099 | A | 8/1996 | Sirand |
| 5,814,228 | A | 9/1998 | Hubred |
| 6,634,567 | B2 | 10/2003 | Hotta |
| 7,571,603 | B2 | 8/2009 | Ripper |
| 10,046,481 | B2 | 8/2018 | Moser |
| 2005/0224513 | A1* | 10/2005 | Strong .................... B05B 1/306 222/1 |
| 2006/0011875 | A1 | 1/2006 | Zurcher |
| 2012/0168652 | A1* | 7/2012 | Saine .................. F16K 31/1221 251/12 |
| 2015/0190945 | A1 | 7/2015 | Moser et al. |

FOREIGN PATENT DOCUMENTS

| | | |
|---|---|---|
| DE | 8328350 U1 | 12/1983 |
| DE | 10020157 A1 | 11/2001 |
| DE | 10226612 A1 | 1/2003 |
| DE | 102004048075 A1 | 4/2006 |
| DE | 102007037780 A1 | 2/2009 |
| DE | 102012106230 A1 | 5/2014 |
| EP | 0635679 A1 | 1/1995 |
| GB | 2136539 A | 9/1984 |
| JP | S49111486 U | 9/1974 |
| JP | H07100410 A | 4/1995 |
| WO | 2012088666 A1 | 7/2012 |
| WO | 2014009172 A1 | 1/2014 |

\* cited by examiner

COMPONENT MIXING JET

CROSS-REFERENCE TO RELATED APPLICATIONS

The present application claims priority of DE 10 2018 104 209.4, filed Feb. 23, 2018, the priority of this application is hereby claimed and this application is incorporated herein by reference.

BACKGROUND OF THE INVENTION

The Invention relates to a component mixing jet comprising a jet nozzle housing with at least one component inlet and one component outlet, wherein an axially movable jet needle is arranged in a reception in the jet nozzle housing which jet needle can rest against the jet nozzle housing with an axial end in the region of the component outlet in a sealable manner, wherein the jet needle is connected with a membrane which is fixed in the jet nozzle housing, wherein a pressure chamber is arranged in the jet nozzle housing at the side of the membrane which is averted from the axial end of the jet needle.

Component mixing jets of this kind are used in high pressure mixing heads for the production of reactive plastic materials, e. g. of polyurethanes. It is the essential task of the nozzles at the high pressure mixing of polyurethanes to convert pressure energy into flow energy. This takes place by pressing the component through a respective dimensioned bore in the nozzle so that a component jet with high flow velocity is created which is guided into a mixing chamber where it meets its reaction partner.

Thereby often the requirement is given that different throughput rates must be possible which would require different nozzle diameters. However, in practice a fixed nozzle diameter is used and the width of the nozzle is varied for said adjustment by positioning a jet needle (nozzle needle), which is axially movable, more or less closely in front of the nozzle bore (i.e. the component outlet).

Each throughput rate requires its own position of the jet needle to create the desired pressure (and thus the respective speed) in the transversal section of the nozzle. At the production of reactive plastic materials it is of specific importance to keep a predetermined mixing rate of the liquid reactive components to guarantee the required properties of the resulting plastic material. The high-pressure pumps which are used for the creation of pressure and for the metering work in dependence on the pressure; insofar the requirement exists to adjust the pressure and the gap respectively for each desired throughput rate exactly.

Component mixing jets are known in different embodiments. Such solutions are shown in DE 100 20 157 A1, in DE 10 2007 037 780 A1 and in DE 10 2012 106 230 A1. All those solutions are basing on a mixing nozzle with an axially movable jet needle, wherein the jet needle seals the component against a controlling medium or against the outer ambience either by means of a dynamic seal (DE 10 2007 037 780 A1) or by means of bellows (DE 100 20 157 A1) and a membrane respectively (DE 10 2012 106 230 A1). Furthermore, all those solutions show that the jet needle is guided in the jet nozzle housing at the side of the components radially and axially to make sure that the jet needle is aligned coaxially to the bore in the nozzle.

Also, the mentioned pre-known solutions teach that the jet needle should be guided as frictionless as possible to be able to adjust the desired position of the jet needle always exactly and free of any hysteresis.

However, it was found in practice that any guidance and bearing respectively of the jet needle in the component chamber (i. e. in the region which can be reached by the components) creates friction which has an appreciable effect onto the positioning of the needle. Especially in the case of components which oil poorly the friction in the guidance cannot be controlled. Thus, all pre-known nozzle designs do not work free of any hysteresis.

During operation the jet needle is always in balance between the controlling pressure in the pressure chamber and the component pressure in the component chamber which in turn is influenced by the component throughput and the open nozzle gap. Already minimal friction forces between the jet needle and jet nozzle housing shift this equilibrium of forces so massive that pressure changes occur which have a significant influence onto the precision of metering.

SUMMARY OF THE INVENTION

Thus, it is the object of the invention to provide a component mixing jet of the generic kind which guarantees a frictionless as well as hysteresis-free actuation of the jet needle. Thus, the object is given to provide a mixing jet with an axially movable jet needle at which the jet needle can be moved frictionless axially in the jet nozzle housing.

The solution of this object by the invention is characterized in that the membrane is designed a holding element for the jet needle which guides the jet needle axially in the reception and holds the same radially in it, wherein the axial region between the membrane and the axial end of the jet needle is free from any bearing element for the jet needle in the region of the component outlet.

Preferably, a non-interrupted annular gap is given in the axial region between the membrane and the at least component inlet between the reception in the jet nozzle housing and the jet needle.

The jet nozzle housing comprises mostly two component inlets which are arranged diametrically opposed in the jet nozzle housing, wherein the center axis of the jet needle is cut by a connecting line between the two component inlets. Namely, this has to be understood in such a manner that the two component inlets are arranged at diametrical opposite sides of the jet needle and so a symmetric charging of the jet needle by the flow medium results which radially deflects the same not or only minimal.

The membrane comprises preferably a thickening in axial direction in its radial outer region (in which it is connected with the jet nozzle housing) and comprises a further thickening in axial direction in its radial inner region, especially in the contact region to the jet needle, wherein the thickness of the membrane is at least in sections reduced in axial direction in the intermediate region which is arranged between the radial outer and the radial inner region. Thus, to obtain the above aim it is insofar provided that the membrane is relatively thick and thus stable at its fixation in the jet nozzle housing as well as in its contact region with the jet needle so that the above-mentioned holding function can be provided optimal. However, between this radial outer and radial inner region of the membrane the same is reduced in its thickness and has preferably (in the radial cross section) a waisted design.

Preferably, at least one surface of the membrane is designed concave in the radial section in the intermediate region, preferably at both sides of the membrane. Corresponding to this design it is preferably provided that at least one contact surface in the jet nozzle housing for the intermediate region of the membrane is designed convex in the radial cross section. So, the membrane can contact plane the contact surface in the jet nozzle housing and is so optimal supported.

Preferably, the membrane is stressless contacting the contact surface in the jet nozzle housing in the position of the jet needle in which the same contacts the jet nozzle housing in the region of the component outlet in a sealed manner.

The jet needle is according to an embodiment of the invention connected with the membrane in one of its axial end regions.

An alternative embodiment provides that the jet needle penetrates the membrane and is supported radially but axially movable in the jet nozzle housing with its section which extends the membrane beyond the side which is averted from the component outlet. The essential advantage of this solution is that a very good support of the jet needle is given without bringing the bearing into contact with the components. The bearing of the jet needle in the jet nozzle housing takes place in this case preferably by means of a roller bearing, especially by a ball lining.

Due to the proposed design the jet needle is supported frictionless in the jet nozzle housing between the membrane and its axial and in the region of the component outlet and can move axially in the same. Due to the described design it results by the membrane that the same supports and guides respectively the jet needle exactly radially and axially in the nozzle body in such a manner that it is not necessary that a support or guidance is required in the axial region between the membrane and the axial needle end in the region of the component outlet (thus at the component side).

The jet needle is in the opened position always in balance between the component pressure (i. e. of the pressure of the reactive components) and the control pressure in the pressure chamber without that further mechanical forces act onto the jet needle. The opening stroke of the jet needle is determined by the respective component volume flow rate.

Furthermore, the proposed design ensures that the jet needle is centered radially at the component inflow and outward flow side in the reception in the jet nozzle housing and in the component flow.

In the closed position of the jet needle the membrane rests preferably at the (lower) area in the jet nozzle housing so that the membrane is not mechanically stained, i. e. is free of tension. A mechanical deformation (elongation) of the membrane occurs preferably only when the jet needle carries out an axial stroke for opening of the component outlet; also here a balance of the pressures is given at both sides (above and below) the membrane.

The magnitude of the annular gap between the reception for the jet needle and the same is thereby chosen so big that the jet needle cannot touch the housing in the axial region between the membrane and the component outlet. However it is chosen sufficiently small so that at a pressure from only one side onto the upper surface of the membrane the forces in the annular gap can be held by the membrane.

Accordingly the proposed concept provides that the jet needle is suspended one-sided axially fully movable in the membrane, wherein the membrane is designed in such a manner that the jet needle is radially centered; additionally the jet needle is centered in the component flow.

In the case of very low viscosity components in combination with a very small component flow rate it can occur that the centering by the component flow is not sufficient and the jet needle deflects radially and starts to swing. For such a case the invention proposes according to the mentioned alternative design a frictionless guidance (e. g. a ball lining) for the jet needle in the controlling chamber (pressure chamber). The acting controlling medium, a gas or a hydraulic fluid, in the pressure chamber can be chosen arbitrary; by doing so the friction of such a guidance can be determined and minimized systematically independently from the properties of the component.

At the intended use of the component mixing jet above the membrane always a control pressure is given. Thereby two operation modes can be distinguished: When no component flow is given the jet needle closes the nozzle bore and the membrane rests at the housing at the side of the components and is thereby not stretched (zero position). In this position the whole control pressure charges one-sided the membrane. At component inflow the jet needle takes a position which results from the equilibrium between the control pressure and the pressure loss due to the opened nozzle cross section. In this position the membrane swims at balanced pressures between component pressure and controlling pressure and is stretched by the opening stroke slightly.

In general membranes are not able to carry pressure differences; at one-sided pressure they must be supported mechanically at the side of the lower pressure. In the region of the component inlet, this is in the present case an annular gap between the nozzle housing and jet needle, the membrane must be (by a respective selection of the material and the dimension) designed in such a manner that the pressure difference can be carried without damages. I. e. in this region it must be designed very massive. At the other side the request is given that the jet needle must carry out its opening stroke possibly without big forces. The opening stroke requires a thin membrane with high elongation at low forces. However directed to the housing the membrane must be designed again massive to provide sufficient stability in its mechanical clamping at the housing; preferably it has here a toric thickening. Thereby a characteristic shape for the cross section of the membrane results as explained subsequently in detail.

In the practical embodiment of a membrane according to the invention which is molded at the jet needle it has been proven that the jet needle is centered very precisely radially and axially by the membrane but can however be deflected axially in an easy manner. Mounted in a jet nozzle housing it requires no further centering or even guidance. As far as a component flow flows around the jet needle and the inflow of the component takes place annular around the jet needle the jet needle which is attached to the membrane is always centered centrally in the housing. Thereby in the opened mode of operation only the pressure forces resulting from the control pressure and the component pressure act onto the jet needle and the molded membrane. The marginal tensile forces, resulting from the elongation of the membrane at its thinnest location, are negligible in view of the predominant pressure forces. Thereby an axial movable component mixing jet can be provided which adjusts the opening stroke almost without hysteresis and reproducible in dependence on the component flow.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

DETAILED DESCRIPTION OF THE INVENTION

Figure 1:
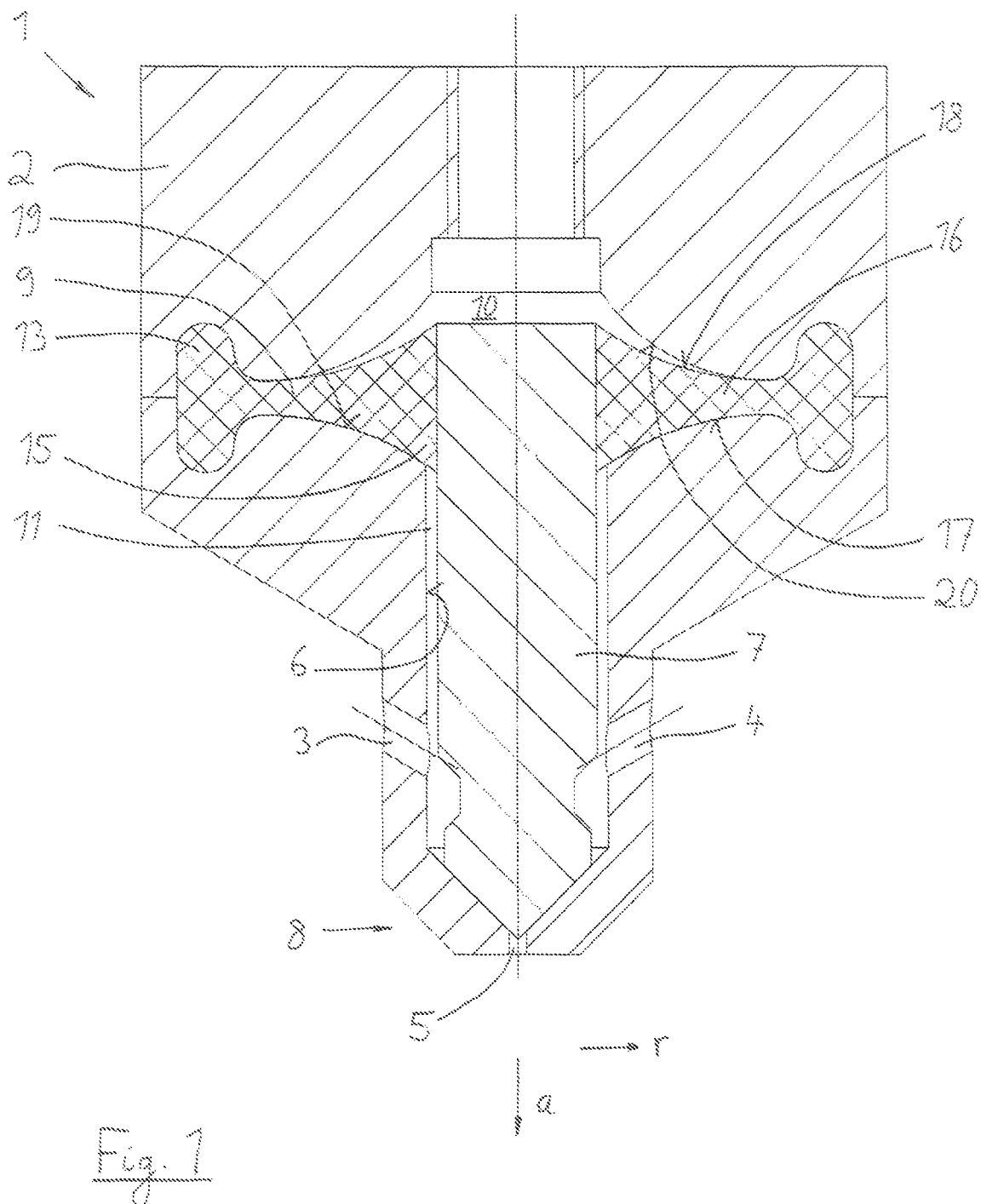
FIG. 1 shows a cross-sectional view through a component mixing jet according to a first embodiment of the invention, wherein the nozzle is closed.

In FIG. 1 a component mixing jet 1 is shown which is used in a high pressure mixing head for the production of polyurethane. In a jet nozzle housing 2 a first component inlet 3 and a second component inlet 4 is provided, wherein the components are dispensed in the axial end region of the component mixing jet 1 through the component outlet 5.

A cylindrical reception 6 for receiving a jet needle 7 is provided in the jet nozzle housing 2 which is movable in axial direction a and can accordingly close the component outlet 5 with its axial end 8 in an end position or can open the same—in a retracted position.

The jet needle 7 is fixedly connected (e. g. vulcanization) with a membrane 9 which closes hermetically the component region (i. e. the space between membrane 9 and component outlet 5). At the other side of the membrane 9 (i. e. "above" the same) a pressure chamber 10 is arranged by which via a controlling pressure a force can be exerted onto the membrane 7 and thus onto the jet needle 7.

The jet needle 7 is arranged with distinct radial clearance in the reception 6 so that an annular gap 11 is given.

It is essential that the membrane 9 is designed as (mechanical) holding element for the jet needle 7 which guides the jet needle 7 in axial direction a in the reception 6 and holds the same in radial direction r in the reception. Thereby, the axial region between the membrane 9 and the axial end 8 of the jet needle 7 in the region of the component outlet 5 is free from any bearing element for the jet needle 7.

The mechanical guidance and holding respectively of the jet needle 7 by the membrane 9 is facilitated by the geometric design of the membrane 9 as explained subsequently with reference to FIG. 4.

In FIG. 1 the component mixing jet 1 is shown in the closed position when thus no component flow is given. The membrane 9 contacts thereby with its surface 17 the housing surface at the side of the components, thus the contact surface 19 in the jet nozzle housing 2 and is thereby not significantly stretched (zero position). This reflects the highest mechanical strain in the membrane 9, due to the geometrical design only at the gap between the needle 7 and reception 6 in the jet nozzle housing 2 big tensions in the material of the membrane occur.

Figure 2:
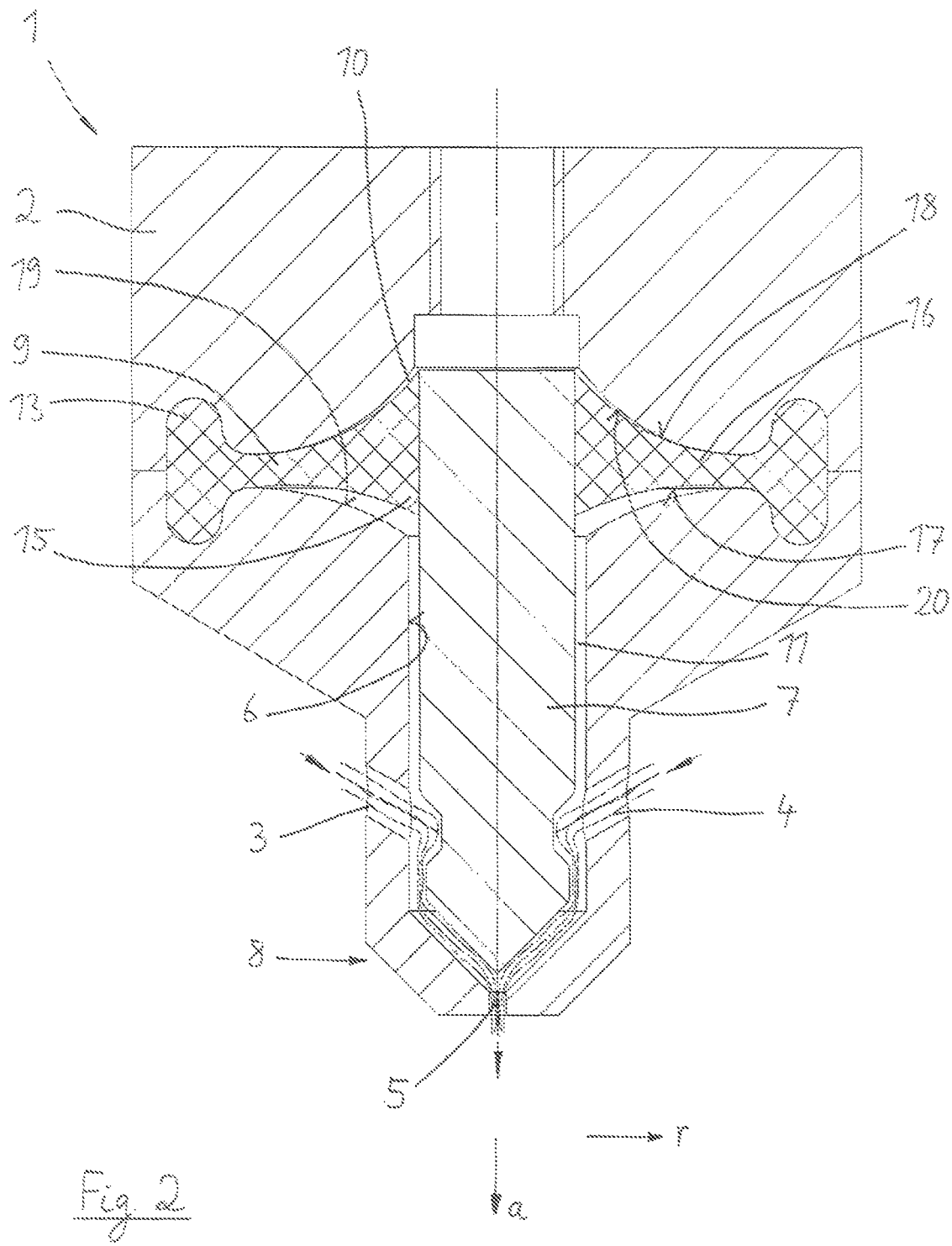
FIG. 2 shows the depiction according to FIG. 1, wherein now the nozzle is opened.

FIG. 2 shows the component mixing jet 1 in the opened working position in which a component flow adjusts the stroke of the jet needle by the pre-dominating equilibrium between control pressure (in the pressure chamber 10) and component pressure (in the component chamber between membrane 9 and axial end 8 of the jet needle 7). The membrane 9 is thereby stretched in the region of the shown waisting by the stroke of the opening.

Figure 3:
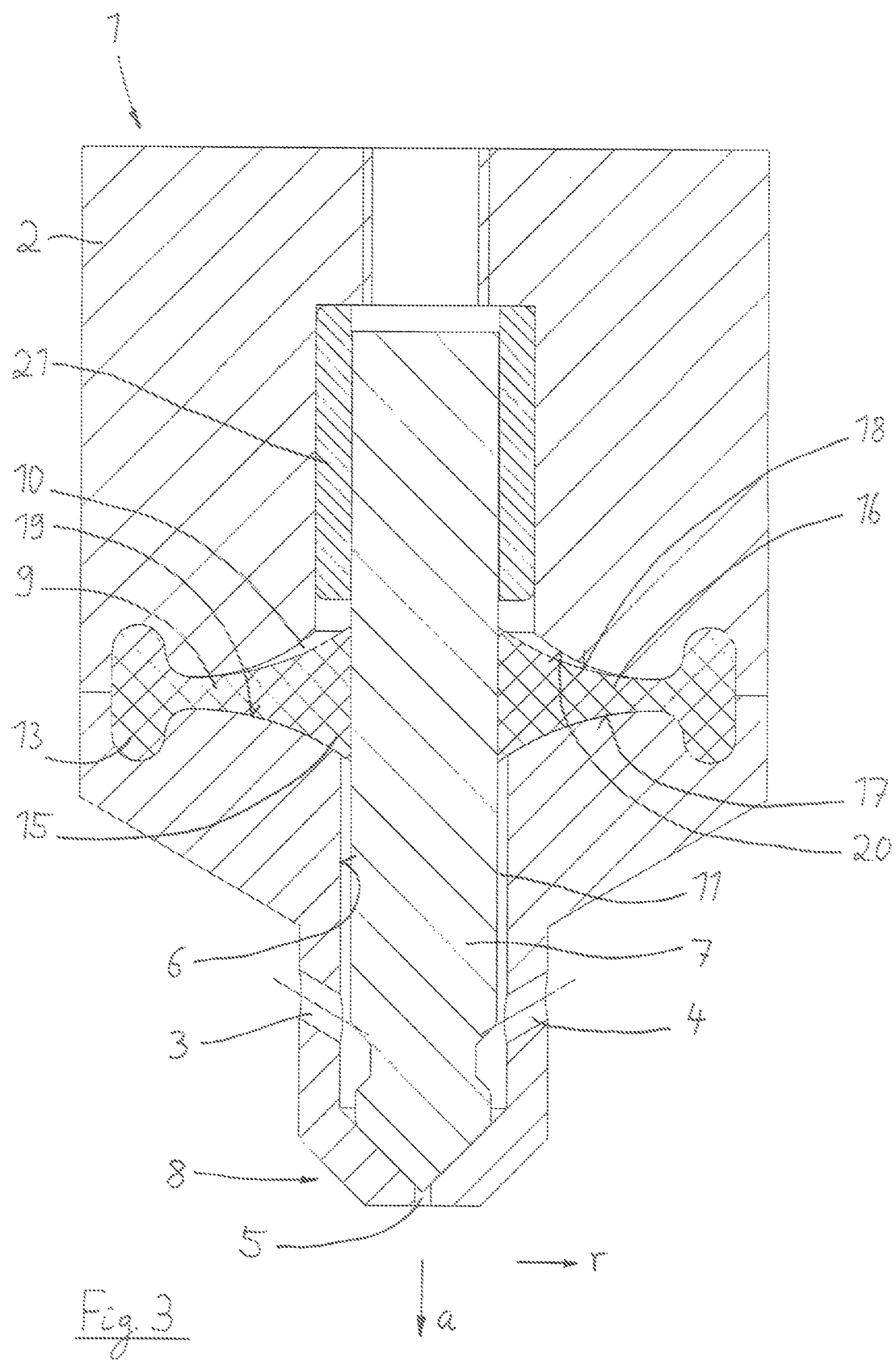
FIG. 3 shows a cross-sectional view through the component mixing jet according to a second embodiment of the invention, wherein the nozzle is closed.

In FIG. 3 an alternative design of the component mixing jet 1 is shown at which the jet needle 7 penetrates axially the membrane 9—in distinction to the solution according to FIGS. 1 and 2—and reaches into the control chamber and pressure chamber 10 respectively. With the section which extends into the pressure chamber 10 the jet needle 7 is here supported by a bearing 21 in the form of a ball lining in the jet nozzle housing 2 which leads to a still more precise guidance of the jet needle 7.

This embodiment has been specifically proven when the component flow is very small and the flow velocity in the annular 11 between jet needle 7 and reception 6 in the jet nozzle housing 2 is very small. In such a mode of operation the centering influence of the component flow onto the jet needle 7 is very small or not active. To avoid swinging of the jet needle 7 in such a situation said guidance by means of the bearing 21 can be provided in the pressure chamber 10 (controlling chamber). In fact this is a compromise because any guidance creates also friction, but it has the advantage compared to pre-known solutions that the friction can be determined independently from the sliding properties of the component. So, with a respective technical design of the guidance and by adding suitable lubricants the friction and also the occurrence of stick-slip effects can be minimized. Thereby also this solution offers a component mixing jet which is free from any hysteresis.

Figure 4:
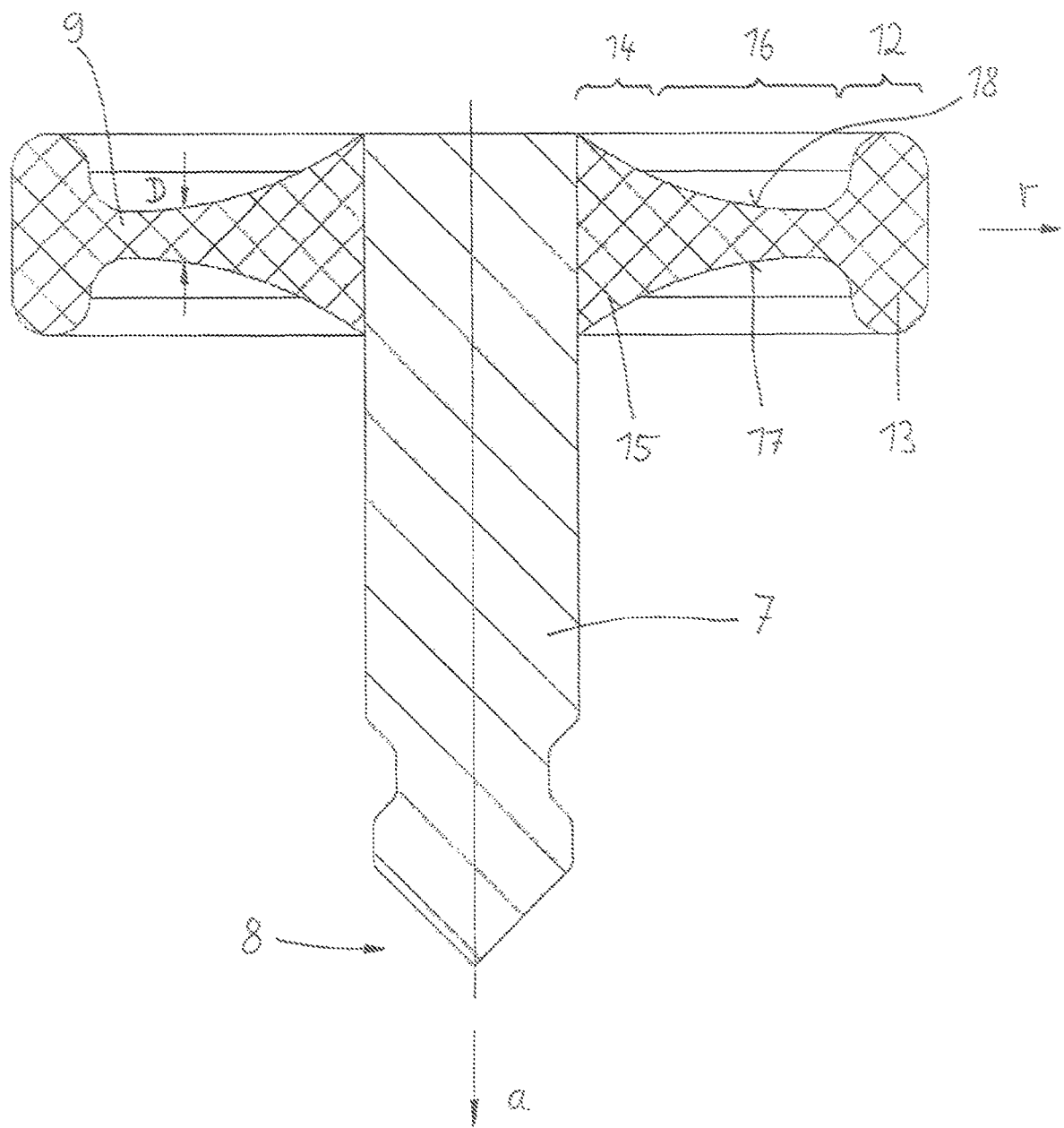
FIG. 4 shows the cross-sectional view through the jet needle and the membrane of the component mixing jet.

FIG. 4 shows the preferred geometrical design of the membrane 9. Directed to the jet needle 7 the membrane 9 is significantly thickened so that the material of the membrane, preferably an elastomere, cannot be drawn into the annular gap 11 between jet needle 7 and jet nozzle housing 2 when the control pressure is acting only one-sided. This radial inner region 14 of the membrane 9 is denoted in FIG. 4 and has preferably a thickness D in axial direction a which is at least 50% of the maximum thickness D of the membrane 9. The thickening is denoted with 15.

The outer edge of the membrane 9 is also significantly thickened and has a bulge which is so dimensioned that a clamping in the jet nozzle housing 2 is possible in such a manner that the pressure difference from the inner of the component mixing jets to the ambient can be carried safely. This radial outer region 12 of the membrane 9 is also denoted in FIG. 4 and has substantial the maximum thickness D of the membrane 9, measured in axial direction a (apart from corner arcs of the thickening 13 in the region 12).

In the center region of the membrane 9, which is denoted in FIG. 4 as intermediate region 16, the membrane 9 is waisted so strongly that the required extension due to the maximum opening stroke of the jet needle 7 can be carried out with a low force without overloading the material of the membrane mechanically and fatigue endurable. The waisted region of the membrane is thereby selected in such a manner that the radial length and the thickness of the membrane in the region of the waist is about 3 to 5 times the maximum stroke of the jet needle. At this embodiment the jet needle 7 can be moved axially easily and is sufficiently centered. It can be seen from FIG. 4 that the minimum thickness D of the membrane 9 in the intermediate region 16 is only a small part of the maximum thickness of the membrane 9 (namely in the region of the thickening 13 and thickening 15 respectively). Preferably said minimal thickness D in the intermediate region 16 is maximum 30%, preferably maximum 25%, of the maximal thickness of the membrane 9 (i. e. in the region of the thickenings 13 and 15).

In FIG. 4 the (at least partial) concave design of both surfaces 17 and 18 can also be seen which are provided for respectively contacting the (convex) contact surfaces 19 and 20 in the jet nozzle housing 2.

While specific embodiments of the invention have been shown and described in detail to illustrate the inventive principles, it will be understood that the invention may be embodied otherwise without departing from such principles.

LIST OF REFERENCES

1 Component mixing jet
2 Jet nozzle housing
3 Component inlet
4 Component inlet
5 Component outlet
6 Reception in the jet nozzle housing for the jet needle
7 Jet needle
8 Axial end of the jet needle
9 Membrane
10 Pressure chamber
11 Annular gap
12 Radial outer region of the membrane
13 Thickening
14 Radial inner region of the membrane
15 Thickening
16 Intermediate region
17 Surface of the membrane
18 Surface of the membrane
19 Contact surface in the jet nozzle housing
20 Contact surface in the jet nozzle housing
21 Bearing (ball lining)
a Axial direction
r Radial direction
D Thickness of the membrane

We claim:

1. A component mixing jet comprising a jet nozzle housing with at least one component inlet and one component outlet, wherein an axially movable jet needle is arranged in a reception in the jet nozzle housing which jet needle can rest against the jet nozzle housing with an axial end in the region of the component outlet in a sealable manner, wherein the jet needle is connected with a membrane which is fixed in the jet nozzle housing, wherein a pressure chamber is arranged in the jet nozzle housing at the side of the membrane which is averted from the axial end of the jet needle, wherein the membrane is designed as a holding element for the jet needle which guides the jet needle axially in the reception and holds the same radially in it, wherein the axial region between the membrane and the axial end of the jet needle is free from any bearing element for the jet needle in the region of the component outlet, wherein the membrane comprises a thickening in axial direction in its radial outer region and comprises a thickening in axial direction in its radial inner region, wherein the thickness of the membrane is at least in sections reduced in axial direction in the intermediate region which is arranged between the radial outer and the radial inner region, wherein at least one surface of the membrane is designed concave in the radial section in the intermediate region, and wherein at least one contact surface in the jet nozzle housing for the intermediate region of the membrane is designed convex in the radial cross section.

2. A component mixing jet according to claim 1, wherein a non-interrupted annular gap is given in the axial region between the membrane and the at least one component inlet between the reception in the jet nozzle housing and the jet needle.

3. A component mixing jet according to claim 1, wherein the jet nozzle housing comprises two component inlets which are arranged diametrically opposed in the jet nozzle housing, wherein the center axis of the jet needle is cut by a connecting line between the two component inlets.

4. A component mixing jet according to claim 1, wherein the membrane is stressless contacting the at least one contact surface in the jet nozzle housing in the position of the jet needle in which the same contacts the jet nozzle housing in the region of the component outlet in a sealed manner.

5. A component mixing jet according to claim 1, wherein the jet needle is connected with the membrane in one of its axial end regions.

6. A component mixing jet according to claim 1, wherein the jet needle penetrates the membrane and is supported radially but axially movable in the jet nozzle housing with its section which extends the membrane beyond the side which is averted from the component outlet.

7. A component mixing jet according to claim 6, wherein the bearing of the jet needle in the jet nozzle housing takes place by a roller bearing.

\* \* \* \* \*